US00RE40603E

(19) United States
(12) Reissued Patent
Owaki et al.

(10) Patent Number: US RE40,603 E
(45) Date of Reissued Patent: Dec. 9, 2008

(54) SILVER HALIDE PHOTOGRAPHIC LIGHT-SENSITIVE MATERIAL

(75) Inventors: Tomonori Owaki, Minami-Ashigara (JP); Tadanobu Sato, Minami-Ashigara (JP); Takahiro Matsuno, Minami-Ashigara (JP)

(73) Assignee: FUJIFILM Corporation, Tokyo (JP)

(21) Appl. No.: 10/959,946

(22) Filed: Oct. 7, 2004

Related U.S. Patent Documents

Reissue of:
(64) Patent No.: 6,579,670
Issued: Jun. 17, 2003
Appl. No.: 09/879,147
Filed: Jun. 13, 2001

(30) Foreign Application Priority Data

Jun. 13, 2000 (JP) ..... 2000-176887

(51) Int. Cl.
*G03C 1/06* (2006.01)
*G03C 1/005* (2006.01)
*G03C 1/494* (2006.01)

(52) U.S. Cl. ..... 430/604; 430/605; 430/567; 430/599

(58) Field of Classification Search ..... 430/567, 430/599, 604, 605
See application file for complete search history.

(56) References Cited

U.S. PATENT DOCUMENTS 4,835,093 A * 5/1989 Janusonis et al. ..... 430/567
4,847,191 A * 7/1989 Grzeskowiak ..... 430/605
4,981,781 A * 1/1991 McDugle et al. ..... 430/605
5,037,732 A * 8/1991 McDugle et al. ..... 430/567
5,500,335 A * 3/1996 Bell ..... 430/567
5,985,508 A * 11/1999 Ito et al. ..... 430/264

FOREIGN PATENT DOCUMENTS

JP 1-285941 * 11/1989
JP 7-72576 3/1995
JP 11-202440 7/1999
JP 11-295841 * 10/1999

OTHER PUBLICATIONS

JP–A–8–211532, Kazuki et al, Example 1, columns 61–62, Aug. 20, 1996.
JP–A–8–286311, Tetsuo et al, Example 1, columns 63–64, Nov. 1, 1996.
Japanese Office Action dated Jan. 23, 2008.

* cited by examiner

*Primary Examiner*—Geraldina Visconti
(74) *Attorney, Agent, or Firm*—Sughrue Mion, PLLC

(57) ABSTRACT

The present invention provides a silver halide photographic light-sensitive material comprising a support having thereon at least one silver halide emulsion layer, wherein the silver halide emulsion contained in the silver halide emulsion layer comprises silver halide grains having a silver chloride content of 90 mol % or more, and the silver halide emulsion further contains a metal complex having $H_2O$ as a ligand. It also provides a silver halide photographic light-sensitive material comprising a support having thereon at least one silver halide emulsion layer, wherein the silver halide emulsion contained in the silver halide emulsion layer contains a metal complex having $O^{2-}$ as a ligand.

9 Claims, No Drawings

SILVER HALIDE PHOTOGRAPHIC LIGHT-SENSITIVE MATERIAL

Matter enclosed in heavy brackets [ ] appears in the original patent but forms no part of this reissue specification; matter printed in italics indicates the additions made by reissue.

FIELD OF THE INVENTION

The present invention relates to a silver halide photographic light-sensitive material. More specifically, it relates to a silver halide photographic light-sensitive material having high gradation photographic property excellent in latent image stability and excellent in reciprocity failure.

BACKGROUND OF THE INVENTION

One technology modifying the quality of silver halide grains and improving the total performance of a silver halide photographic light-sensitive material to a desired extent is a doping technology, i.e., a technology of incorporating a dopant which is a substance other than silver ion and a halide ion. In particular, a large number of researches on a doping technology of transition metal complex ions have been made. It is generally recognized that incorporation of a transition metal complex ion as a dopant effectively changes a photographic performance even when the amount is extremely small.

It is generally known that doping of an iridium compound having halogens as main ligands is effective for improving reciprocity failure of a silver halide emulsion. For example, JP-B-43-4935 (The term "JP-B" as used herein means an "examined Japanese patent publication") discloses that addition of an iridium compound at the preparation of silver halide grains decreases the variation of gradation within a wide range of exposure time. Further, U.S. Pat. No. 4,997,751 describes addition of iridium from the surface of silver halide grains improves reciprocity failure.

In a silver halide emulsion having a high silver chloride content which contains an iridium compound well known as a compound improving reciprocity failure as a dopant, however, the occurrence of latensification during 15 seconds to about 2 hours after exposure is disclosed in Journal of Photographic Science, vol. 33, p. 201 by H. Zwicky. When such phenomenon occurs, sensitivity and gradation varies during exposure to development, and thus it is undesirable from a practical standpoint.

JP-A-1-105940 (The term "JP-A" as used herein means an "unexamined published Japanese patent application") discloses that an emulsion excellent in reciprocity failure can be obtained by an emulsion of a high silver chloride content having silver bromide-rich domains to which iridium is selectively doped. However, latent image stability sometimes deteriorates when the reaction conditions for forming the silver bromide-rich domains is varied, and therefore further improvement has been desired.

With regard to the iridium compounds, iridium compounds having various ligands such as aqua, cyano, nitrosyl, and thionitrosyl are disclosed in JP-A-1-285941, JP-A-3-118535, JP-A-4-213449, JP-A-4-278940, JP-A-5-66511, JP-A-5-313277, JP-A-6-82947, JP-A-7-72569, JP-A-7-72576, JP-A-11-202440, JP-A-11-295841. In these publications, however, it is not known that the doping of an iridium aqua complex or an iridium oxo complex improves reciprocity failure without deteriorating latent image stability during several hours after exposure. As described above, there is no satisfactory technology for obtaining an emulsion excellent in reciprocity failure without deteriorating latent image stability during several hours after exposure using a silver halide emulsion of a high silver chloride content.

It is known that the doping of a compound other than iridium is also effective. U.S. Pat. No. 4,847,191 discloses silver halide grains formed in the presence of a rhodium(III) complex having 3, 4, 5 or 6 cyanide ions as ligands. This patent publication shows the reduction of the high (illumination) intensity reciprocity failure by the action of the dopant. European Patent Nos. 0336425 and 0336426, and JP-A-2-20854 each discloses a silver halide emulsion whose grains are formed by doping a rhenium, ruthenium, osmium or iridium complex having 4 or more cyano ligands. These publications describe increase in the storage stability of sensitivity and gradation and improvement in the low (illumination) intensity reciprocity failure. European Patent No. 0336427 and JP-A-2-20852 each discloses a silver halide emulsion wherein a six-cordinate vanadium, chromium, manganese, iron, ruthenium, osmium, rhenium, or iridium complex containing a nitrosyl or thionitorsyl ligand is used, whereby improvement in the low (illumination) intensity reciprocity failure is resulted in without lowering sensitivity at medium illumination intensity.

SUMMARY OF THE INVENTION

An object of the present invention is directed to provide a silver halide photographic light-sensitive material excellent in latent image stability and also excellent in reciprocity failure.

The objects of the present invention can be achieved by the following silver halide photographic light-sensitive materials of (1) to (14).

(1) A silver halide photographic light-sensitive material comprising a support having thereon at least one silver halide emulsion layer, wherein the silver halide emulsion contained in the silver halide emulsion layer comprises silver halide grains having a silver chloride content of 90 mol % or more, and the silver halide emulsion further contains a metal complex having $H_2O$ as a ligand.

(2) The silver halide photographic light-sensitive material according to the above (1), wherein the metal complex is represented by formula (I):

$$[M(H_2O)_nX_m]^l \quad (I)$$

wherein M represents any of metal or metal ion, X— represents a halogen atom, l is an integer of −5 to 0, m is an integer of 1 to 5, and n is an integer of 1 to 5.

(3) The silver halide photographic light-sensitive material according to the above (2), wherein M in the formula (I) is an ion of at least one metal selected from the group consisting of iron, ruthenium, manganese, cobalt, rhodium, iridium, titanium, chromium, rhenium, and osmium.

(4) The silver halide photographic light-sensitive material according to the above (2), wherein M in the formula (I) is an iridium ion.

(5) The silver halide photographic light-sensitive material according to any one of the above (1) to (4), wherein the silver halide emulsion comprises silver halide grains having a silver bromide content of 0.1 to 10 mol %.

(6) The silver halide photographic light-sensitive material according to any one of the above (1) to (4), wherein the silver halide emulsion comprises silver halide grains having a silver iodide content of 0.02 to 3 mol %.

(7) The silver halide photographic light-sensitive material according to any one of the above (1) to (6), wherein the silver halide emulsion further contains a metal complex represented by formula (II):

$$[IrCl_6]^{s-} \quad (II)$$

wherein s is 2 or 3.

(8) A silver halide photographic light-sensitive material comprising a support having thereon at least one silver halide emulsion layer, wherein the silver halide emulsion contained in the silver halide emulsion layer contains a metal complex having $O^{2-}$ as a ligand.

(9) The silver halide photographic light-sensitive material according to the above (8), wherein the metal complex is represented by formula (III):

$$[M(O)_rX_q]^p \quad (III)$$

wherein M represents any metal or metal ion, X represents a halogen atom, p is an integer of −10 to −1, q is an integer of 1 to 5, and r is an integer of 1 to 5.

(10) The silver halide photographic light-sensitive material according to the above (9), wherein M in the formula (III) is an ion of at least one metal selected from the group consisting of iron, ruthenium, manganese, cobalt, rhodium, iridium, titanium, chromium, and osmium.

(11) The silver halide photographic light-sensitive material according to any one of the above (8) to (10), wherein the silver halide emulsion comprises silver halide grains having a silver bromide content of 0.1 to 10 mol %.

(12) The silver halide photographic light-sensitive material according to any one of the above (8) to (10), wherein the silver halide emulsion comprises silver halide grains having a silver iodide content of 0.02 to 3 mol %.

(13) The silver halide photographic light-sensitive material according to any one of the above (8) to (10), wherein the silver halide emulsion further contains a metal complex represented by the formula (II):

$$[IrCl_6]^{s-} \quad (II)$$

wherein s is 2 or 3.

(14) The silver halide photographic light-sensitive material according to any one of the above (9) to (13), wherein M in the formula III is iridium or rhodium.

DETAILED DESCRIPTION OF THE INVENTION

At incorporation of a complex having a six-coordinated octahedral structure into silver halide grains as a dopant, a $[AgX_6]^{5-}$ unit (X=a halogen ion) in the silver halide grains is replaced by the complex molecule, and the central metal and each ligand occupy the lattice position of the $Ag^+$ ion and the lattice position of the halide ion, respectively as described in patents and literatures including J. Phys.: Condens. Matter 9 (1997) 3227–3240. It is known that $e_g$ orbital (the lowest unoccupied molecular orbital of the complex) of a complex incorporated into a silver halide functions as an electron trap in silver halide grains when the orbital positions at an energy level lower than that of the bottom of conduction band of the silver halide. A photoelectron trap introduced at a proper energy level is considered to be a temporary buffer of photoelectrons generated, and therefore results in an effect of improving high (illumination) intensity reciprocity failure and stability of latent image after exposure.

The energy level of $e_g$ orbital is considered to vary with the ligand-field effect caused by a ligand of a complex. In the case of cyanide ion which provides a strong ligand-field effect, $e_g$ orbital (the lowest unoccupied molecular orbital of a complex) has an energy level higher than that of the bottom of conduction band of the silver halide, and therefore is an energy level which does not participate in electron capture. However, in the case of chloride ion which provides a weak ligand-field effect, $e_g$ orbital (the lowest unoccupied molecular orbital of a complex) positions at an energy level considerably lower than that of the bottom of conduction band of the silver halide, and thus the complex may retain photoelectrons captured for a long period of time.

It is known that the ligand-field splitting of d orbital of a transition metal complex caused by coordination of a ligand depends on the kind of the ligand according to spectrochemical series. The present inventors have focused on the ligand-field splitting of a metal complex and conceived that the splitting relates to the effect of improving high (illumination) intensity reciprocity failure of photographic light-sensitive materials and their latent image stability after exposure. As a result of extensive studies based on the above conception, they have found that a silver halide emulsion containing a metal complex causing an optimum ligand-field splitting exhibits excellent latent image stability after exposure.

The central metal for the metal complex of the present invention is not particularly limited. However, as described in patents and literatures including J. Phys.: Condens. Matter 9 (1997) 3227–3240, in consideration that each $[AgX_6]^{5-}$ unit (X=a halogen ion) in a part of silver halide grains is replaced by a dopant at incorporation of a six-coordinated octahedral complex into silver halide grains as a dopant, preferred in a metal having a four-coordinated structure or a six-coordinated structure around the metal. More preferred is a metal which or whose ion has no unpaired electron or a metal wherein all the stabilized orbitals are filled with electrons when ligand-field splitting occurs at d orbital of the metal. Specifically, preferred is each metal ion of alkaline earth metals, iron, ruthenium, manganese, cobalt, rhodium, iridium, copper, nickel, palladium, platinum, gold, zinc, titanium, chromium, rhenium, osmium, cadmium, and mercury. Of these, more preferred is each ion of iron, ruthenium, manganese, cobalt, rhodium, iridium, titanium, chromium, rhenium, and osmium. Further preferred is each ion of iridium and rhodium. Most preferred is iridium ion.

As a halogen ligand of the metal complex of the present invention, F, Cl, Br, and I are used, and preferred is Cl or Br. Further, n and m, the numbers of ligands in the formula (I), may be each an integer of 1 to 5, and preferred are combinations of n and m wherein sum of n and m equals 4 or 6. Particularly preferred are the following combinations of n and m: (n, m)=(1, 3), (1, 5), (2, 2), or (2, 4). Furthermore, q and r, the numbers of ligands in the formula (III), may also be each an integer of 1 to 5, and preferred are combinations of q and r wherein sum of q and r equals 4 or 6. Particularly preferred are the following combinations of q and r: (q, r)= (1, 3), (1, 5), (2, 2), or (2, 4).

The specific examples of the complexes of the present invention are illustrated, but the metal complexes of the present invention are not limited thereto.

$[Ir(H_2O)Cl_5]^{2-}$ $[Ir(H_2O)_2Cl_4]^-$ $[Ir(H_2O)Br_5]^{2-}$
$[Ir(H_2O)_2Br_4]^{-}$
$[Ir(O)Cl_5]^{4-}$
$[Ir(O)_2Cl_4]^{5-}$
$[Ir(O)Br_5]^{4-}$
$[Ir(O)_2Br_4]^{5-}$

The metal complex of the present invention is an anion. When it is coupled with a cation to form a salt, the counter cation is preferably a cation which is easily water soluble and suitable for the precipitating operation of a silver halide emulsion. Specifically, preferred are alkali metal ions such as sodium ion, potassium ion, rubidium ion, cesium ion, and lithium ion, ammonium ion, and alkylammonium ions represented by the following formula (IV):

$$[R_1R_2R_3R_4N]^+ \quad \text{(IV)}$$

wherein $R_1$, $R_2$, $R_3$, and $R_4$ represent each an substituent optionally selected from alkyl groups such as methyl group, ethyl group, propyl group, iso-propyl group, and n-butyl group. Among them, preferred are tetramethylammonium ion, tetraethylammonium ion, tetrapropylammonium ion, and tetra(n-butyl)ammonium ion wherein $R_1$, $R_2$, $R_3$, and $R_4$ are identical.

The O ligand in the metal complex of the present invention represented by formula (III) is an oxo anion ($O^{2-}$). Otherwise, the 18 electron rule is not satisfied. Incorporation of the O ligand into the emulsion grains can be confirmed by measurement of infrared absorption as disclosed by Mizuno et al. in the lecture D01 at 2000-year's annual meeting of Japan Photographic Association.

The metal complex of the present invention can be added as a solution in water or a mixed solution of water and a suitable organic solvent miscible with water, such as an alcohol, an ether, an glycol, a ketone, an ester, or an amide.

The metal complex of the present invention is preferably included in silver halide grains by directly adding the complex to a reaction solution at the formation of the silver halide grains, or by adding the complex to a halide solution for forming the silver halide grains or other solution and successively adding the solution to the reaction solution for the grain formation. Further, the doping into the silver halide grains may be carried out by combining these methods.

At the doping of the metal complex of the present invention into the silver halide grains, the complex may be present homogeneously in the grains, or may be doped into the surface layer of the grains as disclosed in JP-A-4-208936, JP-A-2-125245, and JP-A-3-188437. Alternatively, the complex may be doped only inside the grains and a dopant-free layer may be added onto the surface of the grains. The surface phase of the grains may be modified by physical ripening with doped fine grains as disclosed in U.S. Pat. Nos. 5,252,451 and 5,256,530. It is also preferable to dope the metal complex into the silver halide grains by preparing a metal complex-doped fine grains and successively adding the fine grains to cause physical ripening. Furthermore, the above doping method may be employed in combination.

The doping amount of the metal complex of the present invention is suitably from $1\times10^{-9}$ to $1\times10^{-2}$ mol, preferably from $1\times10^{-7}$ to $1\times10^{-3}$ mol per mol of silver halide.

At the doping of the metal complex of the present invention into silver halide grains, the complex may be used solely but preferably used in combination with the metal complex represented by formula (II). In the case of combined use, the doping position of each metal complex may be the same or different. The metal complex represented by formula (II) is preferably doped to the position nearer to grain surface than the metal complex of the present invention is doped to. Furthermore, the silver halide of the region in the grain to which the metal complex represented by formula (II) is doped, preferably comprises silver chlorbromide or silver chloroiodide. The doping amount of the metal complex represented by formula (II) may be from $1\times10^{-12}$ to $1\times10^{-5}$ mol, preferably from $1\times10^{-10}$ to $1\times10^{-7}$ mol, more preferably from $1\times10^{-9}$ to $1\times10^{-7}$ mol per mol of silver halide.

The silver halide emulsion for use in the present invention may be incorporated with various polyvalent metal ion impurities during the process of emulsion grain formation or physical ripening. Examples of the compounds to be used include salts or complex salts of iron, ruthenium, osmium, rhenium, rhodium, cadmium, zinc, lead, copper, thallium, and the like, or mixtures thereof. In the present invention, metal complexes of iron, ruthenium, osmium, rhenium, and the like having at least four cyano ligands are especially preferred in view of further enhancement of the sensitivity at high (illumination) intensity and suppression of latent image sensitization. The addition amount of these compounds may vary over a wide range, but is preferably from $1\times10^{-9}$ to $1\times10^{-2}$ mol per mol of silver halide.

As the silver halide emulsion for use in the silver halide photographic light-sensitive material of the present invention, an emulsion comprising silver halide grains having a silver chloride content of 90% or more is used when the emulsion may contain the complex represented by formula (I). More preferred is an emulsion comprising silver halide grains having a silver bromide content of 0.1 to 10 mol % and a silver chloride content of 90 mol % or more, or silver halide grains having a silver iodide content of 0.02 to 3 mol % and a silver chloride content of 90 mol % or more. Further preferred is an emulsion containing the metal complex represented by formula (II), and comprising silver halide grains having a silver bromide content of 0.1 to 10 mol % and a silver chloride content of 90 mol % or more, or silver halide grains having a silver iodide content of 0.02 to 3 mol % and a silver chloride content of 90 mol % or more. Most preferred is an emulsion containing the metal complex represented by formula (II) in a silver halide grain layer having a silver bromide content of 0.1 to 10 mol % or a silver iodide content of 0.02 to 3 mol %, and further comprising silver halide grains having a silver chloride content of 90 mol % or more.

As the silver halide for the silver halide emulsion for use in the silver halide photographic light-sensitive material of the present invention, silver chloride, silver chlorobromide, silver bromide, silver iodochloride, and silver iodobromide can be used without particular limitation in the case of containing the complex of formula (III). Preferred is an emulsion comprising silver halide grains having a silver chloride content of 50% or more. More preferred is an emulsion comprising silver halide grains having a silver bromide content of 0.1 to 10 mol % and a silver chloride content of 90 mol % or more, or silver halide grains having a silver iodide content of 0.02 to 3 mol % and a silver chloride content of 90 mol % or more. Further preferred is an emulsion containing the metal complex represented by formula (II) and comprising silver halide grains having a silver bromide content of 0.1 to 10 mol % and a silver chloride content of 90 mol % or more, or silver halide grains having a silver iodide content of 0.02 to 3 mol % and a silver chloride content of 90 mol % or more. Most preferred is an emulsion containing the metal complex represented by formula (II) in a silver halide grain layer having a silver bromide content of 0.1 to 10 mol % or a silver iodide content of 0.02 to 3 mol %, and further comprising silver halide grains having a silver chloride content of 90 mol % or more.

The size of the silver halide grains for the silver halide emulsion for use in the silver halide photographic light-sensitive material of the present invention is not particularly limited but preferred are grains having an equivalent sphere diameter of 0.01 to 3 mm. The silver halide grains may be either regular crystal form (normal crystal grains) or irregular crystal form, but preferred are normal crystal grains. The normal crystal grains include cubic, octahedral, dodecahedral, tetradecahedral, eicosahedral, and octatetracontahedral ones. The irregular crystal form include spherical and pebble-like forms. Further, for doping the complex of the present invention, grains having one or more twinned planes may be employed, and preferred are square tabular grains and triangular tabular grains having two or three parallel twinned planes. Furthermore, in the tabular grains, it is more preferable that the grain size distribution is monodispersed. The preparation of the monodisperse tabular grains is described in JP-A-63-11928. Monodisperse hexagonal tabular grains are described in JP-A-63-151618 and a circular monodisperse tabular grain emulsion in JP-A-1-131541. Moreover, JP-A-2-838 discloses an emulsion wherein 95% or more of total projected area is occupied by tabular grains having two twinned planes parallel to the main plane and the size distribution of the tabular grains is monodispersed. European Patent 514742A discloses a tabular grain emulsion having a variation coefficient of the grain size of 10% or less which is prepared using a polyalkylene oxide block polymer. Preferred monodisperse grains of the present invention can be prepared by the use of these technologies.

In addition, as the tabular grains, those having a (100) main plane or a (111) main plane are known, and the grains having the former plane are described in U.S. Pat. No. 4,063,951 and JP-A-5-281640 for silver bromide, and in European Patent No. 0534395A1 and U.S. Pat. No. 5,264,337 for silver chloride. The tabular grains having the latter plane are grains having one or more of the above twinned planes and having various shapes, and are described in U.S. Pat. Nos. 4,399,215, 4,983,508, and 5,183,732, and JP-A-3-137632 and JP-A-3-116113 for silver chloride. The dopant of the present invention is preferably applicable to the tabular grains having the (100) main plane of the (111) main plane.

The silver halide grains may have dislocation lines in each grain. The technology of controlled introduction of dislocation in the silver halide grains is described in JP-A-63-220238. According to the publication, dislocation can be introduced by forming a specific highly iodine-rich phase inside the tabular silver halide grains having an average grain size/grain thickness ratio of 2 or more, and covering the outer surface with a phase having a lower iodine content than the highly iodine-rich phase. The introduction of dislocation results in effects of increase of sensitivity, improvement of storage stability, enhancement of latent image stability, and reduction of pressure marks. According to the present invention described in the publication, the dislocation is mainly introduced into edge parts of the tabular grains. The tabular grains wherein dislocation is introduced in the central part is described in U.S. Pat. No. 5,238,796. Further, JP-A-4-348337 discloses normal crystal grains having dislocation inside the grains and also discloses that the dislocation can be introduced by forming epitaxy of silver chloride or silver chlorobromide in normal crystal grains and successive pysical ripening of the epitaxy and/or conversion of the epitaxy with a halogen. To the silver halide grains in the present invention can be introduced dislocation by either the method of forming a highly iodine-rich phase or the method of forming epitaxy of silver chlorobromide. Such introduction of dislocation results in effects of increase of sensitivity and reduction of pressure marks. Dislocation lines in silver halide grains can be observed by direct method using a transmission electron microscope at a low temperature as described in J. F. Hamilton, Photo. Sci. Eng. 1967, 11, 57 or T. Shiozawa, J. Soc. Photo Sci. JAPAN, 1972, 35, 213, for example. Specifically, silver halide grains carefully taken out of an emulsion without applying pressure which can generate dislocation is placed on the mesh for observation on the electron microscope and then the sample is observed in a transmittant way in a cooled state so as to prevent the print-out of the sample by electron beam. At that time, since the thicker grains make the transmittance of electron beam more difficult, the sample can be more clearly observed by the use of a high-pressure type (200 kV or more for 0.25 μm thickness) electron microscope. From the photographs of the grains obtainable by such a method, the position and number of dislocation lines of each grain can be determined, the grain being viewed from the plane perpendicular to the main plane. In the present invention, the effects can be realized in the case that 50% or more of the grains contain 10 or more dislocation lines per grain.

At the preparation of the silver halide emulsion, additives which can be added from the formation of grains to their coating are not particularly limited. For enhancing the growth of crystals at the crystal formation process and making chemical sensitization effective at the grain formation and/or chemical sensitization, a solvent for silver halides may be employed. Water soluble thiocyanate salts, ammonia, thioethers or thioureas are employable as preferable solvents for silver halides. Examples of the solvents for silver halides include thiocyanate salts as described in U.S. Pat. Nos. 2,222,264, 2,448,534, and 3,320,069, ammonia, thioether compounds as described in U.S. Pat. Nos. 3,271,157, 3,574,628, 3,704,130, 4,297,439, and 4,276,347, thione compounds as described in JP-A-53-144319, JP-A-43-82408, and JP-A-55-77737, amine compounds as described in JP-A-54-100717, thiourea compounds as described in JP-A-55-2982, imidazoles as described in JP-A-54-100717, and substituted mercaptotetrazoles as described in JP-A-57-202531.

The method for producing the silver halide emulsion is not particularly limited. In general, an aqueous silver salt solution and an aqueous halide salt solution were added to a reaction solution containing an aqueous gelatin solution under efficient stirring. Specifically, the emulsion can be prepared according to the method described in P. Glafkides, Chimie et Physique Phtographique (published by Paul Montel, 1967), G. F. Dufin, Photographic Emulsion Chemistry (published by The Forcal Press, 1966), and V. L. Zelikman et al., Making and Coating Photographic Emulsion (published by The Forcal Press, 1964). Namely, any of acid process, neutral process, ammonia process, etc. can be employed, and the mode for reacting a soluble silver salt and a soluble halide salt may be any of single jet method, a double jet method, or combination thereof. In the present invention, one mode of the double jet method, i.e., so-called controlled double jet method is preferably employed, wherein pAg in a liquid phase in which a silver halide is formed is maintained constant. It is also preferable to grow the silver halide promptly within a range which does not exceed critical supersaturation, according to a method of changing the addition rate of silver nitrate and an aqueous alkali halide solution depending on grain growing rate as described in British Patent No. 1535016 and JP-B-48-36890 and JP-B-52-16364, or a method of changing the concentration of the aqueous solution as described in U.S. Pat. No. 4,242,445 and JP-A-55-158124. These methods can be preferably employed because re-nucleation does not occur and silver halide grains grow homogeneously.

Instead of the addition of the silver salt solution and halide solution into a reaction vessel, it is also preferable to use a method of obtaining silver halide grains by adding fine grains prepared previously into a reaction vessel and causing nucleation and/or grain growth. The technology is described in JP-A-1-183644, JP-A-1-183645, JP-A-2-44335, JP-A-2-43534, and JP-A-2-43535, and U.S. Pat. No. 4,879,208. According to the method, the distribution of halide ions in crystals of the emulsion grains can be made perfectly homogeneous, whereby preferable photographic properties can be attained. Further, in the present invention, emulsion grains having various structures can be used. Grains having a so-called core/shell double structure comprising grain inside (core part) and outside (shell part), grains having a triple structure as described in JP-A-60-222844, and grains having a multi-layered structure may be used. In the case of emulsion grains having a structure inside the grains, grains having a so-called junction structure can be prepared other than the above enwrapping structure. Examples of the grains having a junction structure are described in JP-A-58-108526, JP-A-59-16254, and JP-A-59-133540, JP-B-58-24772, and European Patent No. 199290A2. The crystals subjected to junction can be grown at edge or corner parts or plane parts of host crystals with a composition different from that of the host crystals. Such junction crystals can be formed even when the host crystals have homogeneous halogen composition or have a core/shell type structure. In the case of the junction structure, combination of silver halide themselves is, of course, possible, and silver salt compounds without rock structure such as silver rhodanide and silver carbonate can also be used provided that they can form junction grains in combination with a silver halide.

In the case of silver iodobromide grains having these structures, in the core/shell type grains, for example, it is possible that the silver iodide content is high at the core part, while the content is low at the shell part, or the silver iodide content is low at the core part, while the content is high at the shell part. Likewise, in the grains having a junction structure, the grains may have a high silver iodide content in the host crystals and a relatively low silver iodide content in the junction crystals, or the grain may have reverse silver iodide contents in the host and junction crystals. Further, the boundary part of the different halogen composition in the grains having these structures may have distinct borders, or indistinct borders owing to the formation of mixed crystals according to the compositional difference, or may be intentionally provided with a continuous structural change. The the silver halide emulsion for use in the present invention may be subjected to a treatment for making the grains round as described in European Patent Nos. 0096727B1 and 0064412B1, or to a treatment for modifying the surface as described in German Patent No. 2306447C2 and JP-A-60-221320. The silver halide emulsion is preferably surface latent image type. However, an internal latent image type emulsion can be also used by selecting a developing solution or developing conditions. Moreover, a shallow internal latent image type emulsion having a thin covering shell can be also used depending on the purpose.

The silver halide emulsion is usually subjected to spectral sensitization. In general, a methine dye is preferably used as a spectral sensitizing dye. The methine dyes include cyanine dyes, merocyanine dyes, composite cyanine dyes, composite merocyanine dyes, holopolar cyanine dyes, hemicyanine dyes, styryl dyes, and hemioxonol dyes. For these dyes, any of the rings usually employed for cyanine dyes as a basic heterocyclic ring can be applied. Examples of the basic heterocyclic ring include pyrroline ring, oxazoline ring, thiazoline ring, pyrrole ring, oxazole ring, thiazole ring, selenazole ring, imidazole ring, tetrazole ring, and pyridine ring. In addition, a condensed ring of cyclic hydrocarbon rings and aromatic hydrocarbon rings can be also employed as the heterocyclic ring. Examples of the condensed ring include indolenine ring, benzindolenine ring, indole ring, benzoxazole ring, naphthoxazole ring, benzothiazole ring, naphthothiazole ring, benzoselenazole ring, benzimidazole ring, and quinoline ring. Substituents may be bonded to the carbon atoms of these rings. To a merocyanine dye or a composite merocyanine dye, a 5- or 6-membered heterocyclic ring having a ketomethylene structure may be applied. Examples of such a heterocyclic ring include pyrazoline-5-one ring, thiohydantoin ring, 2-thiooxazolidine-2,4-dione ring, thiazolidine-2,4-dione ring, rhodanine ring, and thiobarbituric acid ring.

The addition amount of the sensitizing dye is preferably from 0.001 to 100 mmol, more preferably from 0.01 to 10 mmol per mol of silver halide. The sensitizing dye is preferably added during chemical sensitization or before chemical sensitization, e.g., at grain formation or at physical ripening.

According to the present invention, there is provided improvement of the sensitivity (intrinsic sensitivity) of the silver halide grains after chemical sensitization toward the light having a wavelength of intrinsic absorption of the grains. Namely, the doping of each complex of the present invention can reduce the desensitization caused by adsorption of the spectral sensitizing dye onto the surface of each silver halide grain, toward a light having a wavelength longer than about 450 nm (densensitization by sensitizing dye). The present invention possesses an effect of effective prevention of the desensitization by sensitizing dye, in addition to the effect of increasing the intrinsic sensitivity of the silver halide.

To the silver halide emulsion may be added a dye exhibiting no spectral sensitizing action itself or a substance which does not absorb a visible light substantially and exhibits supersensitization, together with the sensitizing dye. Examples of such a dye or substance include an aminostyryl compound substituted by a nitrogen-containing heterocyclic group as described in U.S. Pat. Nos. 2,933,390 and 3,635,721, an aromatic organic acid-formaldehyde condensate as described in U.S. Pat. No. 3,743,510, a cadmium salt and an azaindene compound. Combinations of the sensitizing dyes and the above dyes or substances are described in U.S. Pat. Nos. 3,615,613, 3,615,641, 3,617,295, and 3,635,721.

The silver halide emulsion is usually subjected to chemical sensitization at its use. The chemical sensitization includes chalcogen sensitization such as sulfur sensitization, selenium sensitization, and tellurium sensitization; noble metal sensitization such as gold sensitization; and reduction sensitization and may be carried out individually or in combination. In the present invention, a combined chemical sensitization of sulfur sensitization and gold sensitization is preferably employed, but selenium sensitization or tellurium sensitization is also preferably employed. In the sulfur sensitization, an labile sulfur compound is used as a sensitizer. The labile sulfur compounds are described in P. Glafkides, Chimie et Physique Photographeque (published by Paul Montel, 1987, fifth edition), Research Disclosure, vol. 307, No. 307105, T. H. James ed., The Theory of the Photographic Process (published by Macmillan, 1977, fourth edition), H. Frieser, Die Grundlagender Photographischen Prozess mit Silver-halogeniden (Akademische Verlags-geselbshaft, 1968). Examples of the sulfur sensitizer include thiosulfates such as sodium thiosulfate and p-toluenethiosulfonate; thioureas such as diphenylthiourea, triethylthiourea, N-ethyl-N'-(4-methyl-2-thiazolyl)thiourea, and carboxymethyltrimethylthiourea; thioamides such as thioacetamide and N-phenylthioacetamide; rhodanines such as rhodanine, N-ethylrhodanine, 5-benzylidenerhodanine, 5-benzylidene-N-ethylrhodanine, and diethylrhodanine; phosphine sulfides such as trimethylphosphine sulfide; thiohydantoins; 4-oxo-oxazolidene-2-thiones; dipolysulfides such as dimorpholine disulfide, cystine, and hexathiocanethione; mercapto compounds such as cysteine, polythionic acid salts and elementary sulfur. Active gelatin can be also used as a sulfur sensitizer.

In the selenium sensitization, an labile selenium compound is used as a sensitizer. The labile selenium compounds are described in JP-B-43-13489 and JP-B-44-15748, and JP-A-4-25832, JP-A-4-109240, JP-A-4-271341, and JP-A-5-40324. Examples of the selenium sensitizer include colloidal metal selenium; selenoureas such as N,N-dimethylselenourea, trifluoromethylcarbonyltrimethylselenourea, and acetyltrimethylselenourea; selenoamides such as selenoacetoamide and N,N-diethylphenylselenoamide; phosphine selenides such as triphenylphosphine selenide and pentafluorophenyltriphenylphosphine selenide; selenophosphates such as tri-p-tolyl selenophosphate and tri-n-butyl selenophosphate; selenoketones such as selenobenzophenone; isoselenocyanates; selenocarboxylic acids; selenoesters; and diacyl selenides. Relatively stable selenium compounds such as selenious acid, potassium selenocyanide, selenazoles, and selenides described in JP-B-46-4553 aqnd JP-B-52-34492 can be also used as selenium sensitizers.

In the tellurium sensitization, an labile tellurium compound is used as a sensitizer. The labile tellurium compounds are described in Canadian Patent No. 800,958, British Patent Nos. 1,295,462 and 1,396,696, and JP-A-4-204640, JP-A-4-271341, JP-A-4-333043, and JP-A-5-303157. Examples of the tellurium sensitizer include telluroureas such as tetramethyltellurourea, N,N'-dimethyltellurourea, and N,N'-diphenylethylenetellurourea; phosphine tellurides such as butyl-diisopropylphosphine telluride, tributylphosphine telluride, tributoxyphosphine telluride, and ethoxydiphenylphosphine telluride; diacyl(di) telluride, and such as bis(diphenylcarbamoyl) ditelluride, bis (N-phenyl-N-methylcarbamoyl) ditelluride, bis(n-phenyl-N-methylcarbamoyl) telluride, and bis(ethoxycarbonyl) telluride; isotellurocyanates such as allyl isotellurocyanate; telluroketones such as telluroacetone and telluroacetophenone; telluroamides such as telluroacetamide and N,N-dimethyltellurobenzamide; tellurohydrazides such as N,N', N'-trimethyltellurobenzhydrazide; telluroesters such as t-butyl-t-hexyltelluroester; colloidal tellurium; (di) tellurides, and other tellurium compounds such as potassium telluride and sodium telluropentathionate.

In the noble metal sensitization, salts of noble metals such as gold, platinum, palladium, iridium, etc. are used as sensitizers. The salts of noble metals are described in P. Grafkides, Chimie et Physique Photographique (published by Paul Montel, 1987, fifth edition) and Research Disclosure, vol. 307, No. 307105. Gold sensitization is particularly preferred. Examples of the gold sensitizer include chloroauric acid, potassium chloroaurate, potassium aurithiocyanate, gold sulfide, and gold selenide. Also usable are the compounds described in U.S. Pat. Nos. 2,642,361, 5,049,484, and 5,049,485.

In the reduction sensitization, reducing compounds are used as sensitizers. The reducing compounds are described in P. Grafkides, Chimie et Physique Photographique (published by Paul Montel, 1987, fifth edition) and Research Disclosure, vol. 307, No. 307105. Examples of the reducing sensitizers include aminoiminomethanesulfinic acid (thiourea dioxide); borane compounds such as dimethylaminoborane; hydrazine compounds such as hydrazine and p-tolylhydrazine; polyamine compound such as diethylenetriamine and triethylenetetramine; stannous chloride; silane compounds; reductones such as ascorbic acid; sulfite; aldehyde compounds; and hydrogen. Further, the reduction sensitization can be carried out in an atmosphere of a high pH or silver ion excess, so-called silver ripening.

The chemical sensitization may be carried out in combination of two or more. The combination of chalcogen sensitization with gold sensitization is particularly preferred. Further, the reduction sensitization is preferably carried out at the formation of silver halide grains. The amount of the sensitizer is generally determined depending on the kind of silver halide grains to be used and the conditions for chemical sensitization. The amount of the chalcogen sensitizer is generally from $10^{-8}$ to $10^{-2}$ mol, preferably from $10^{-7}$ to $5\times10^{-3}$ mol per mol of the silver halide. The amount of the noble metal sensitizer is preferably from $10^{-7}$ to $10^{-2}$ mol per mol of the silver halide. The conditions for chemical sensitization is not particularly limited. The pAg is from 6 to 11, preferably from 7 to 10. The pH is preferably from 4 to 10. The temperature is preferably from 40 to 95° C., more preferably from 45 to 85° C.

The silver halide emulsion preferably contains various compounds for the purpose of prevention of fog at the process of producing light-sensitive materials, during the storage or during the processing of photographs, or stabilization of photographic properties. Examples of such compounds include azoles such as benzothiazolium salts, nitroindazoles, triazoles, benzotriazoles, and benzimidazoles including especially nitro- or halogen-substituted benzimidazoles; heterocyclic mercapto imidazoles such as mercaptothiazoles, mercaptobenzothiadiazoles, mercaptobenzimid azoles, mercaptothiadiazoles, mercaptotetrazoles including especially 1-phenyl-5-mercaptotetrazole, and mercaptopyridines; the above heterocyclic mercapto compounds having a water-soluble group such as carboxyl group or sulfonic group; thioketone compounds such as oxazolinethione; azaindenes such as tetraazaindenes including especially 4-hydroxy-substituted (1,3,3a,7)tetraazaindenes; benzenethiosulfonic acids; and benzenesulfinic acid. In general, these compounds are known as antifoggants or stabilizers.

The antifoggant or stabilizer is usually added after chemical sensitization. However, the addition may be carried out during chemical sensitization or prior to chemical sensitization. Specifically, in the process of forming silver halide grains, the addition may be carried out during the addition of silver salt solution, at any time of from the completion of the salt addition to the start of chemical sensitization, or during chemical sensitization, preferably at any time of from the start to 50% sensitization, more preferably to 25% sensitization.

The layer constitution of silver halide photographic materials is not particularly limited. However, in the case of color photographic materials, they have a multi-layered structure for recording blue color, green color and red color, separately. Each silver halide layer may comprise two layers of a high speed layer and a low speed layer. The silver halide photographic materials of the present invention can be also applied to X-ray light-sensitive materials, black and white light-sensitive materials, light-sensitive materials for plate-making, and photographic papers, other than color photographic materials.

Various additives for silver halide emulsion such as binders, chemical sensitizers, spectral sensitizers, stabilizers, gelatins, hardeners, surfactants, antistatic agents, polymer latexes, matting agents, color couplers, UV absorbers, antifading agents, and dyes; supports for photographic materials; and methods for treating photographic materials such as methods for coating, methods for exposure, and methods for development can be selected with reference to Research Disclosure, vol. 176, No. 17643 (RD-17643), ibid., vol. 187, No. 18716 (RD-18716), ibid., vol. 225, No. 22534 (RD-22534). The matters described in Research Disclosure are shown in the following list.

| | Kind of Additives | RD-17643 | RD-18716 | RD-22534 |
|---|---|---|---|---|
| 1 | chemical sensitizer | p.23 | p.648, right column | p.24 |
| 2 | sensitivity incresing agent | | p.648, right column | |
| 3 | spectral sensitizer, supersensitizer | pp.23-24 | p.648, right column to p.649, right columns | pp.24-28 |
| 4 | brightening agent | p.24 | | |
| 5 | antifoggant, stabilizer | pp.24-25 | p.649, right column | pp.24, 31 |
| 6 | light absorber filter dye, UV absorber | pp.25-26 | p.649, right column to p.650, right columns | |
| 7 | antistaining agent | p.25, right column | p.650, left to right column | |
| 8 | dye image stabilizer | p.25 | | p.32 |
| 9 | hardener | p.26 | p.651, left column | p.32 |
| 10 | binder | p.26 | p.651, left column | p.28 |
| 11 | plasticizer, lubricant | p.27 | p.650, right column | |
| 12 | coating aid, surfactant | pp.26-27 | p.650, right column | |
| 13 | antistatic agent | p.27 | p.650, right column | |
| 14 | color coupler | p.25 | p.649 | p.31 |

As the gelatin hardener, preferred are, for example, active halogen compounds such as 2,4-dichloro-6-hydroxy-1,3,5-triazine and its sodium salt, and active vinyl compounds such as 1,3-bisvinylsulfonyl-2-propanol, 1,2-bis(vinylsulfonylacetamide)ethane and vinyl polymers having vinyl sulfonyl groups in the chain because they harden hydrophilic colloids such as gelatin promptly and impart stable photographic properties. N-Carbamoylpyridinium salts such as (1-morpholinocarbonyl-3-pyridinio) methanesulfonate and haloamidinium salts such as 1-(1-chloro-1-pyridinomethylene)pyrrolidinium 2-naphthalenesulfonate can be also preferably used because of the high hardening rate.

The color photographic materials can be subjected to developing treatment according to conventional methods described in Research Disclosure, vol. 176, No. 17643 and ibid., vol. 187, No. 18716. The color photographic light-sensitive materials are usually subjected to water-washing treatment or treatment with a stabilizer after the treatment of development, bleach-fixing, or fixing. The water-washing process is generally carried out in a manner of counter current washing using two or more baths for saving water. The stabilizing treatment is carried out instead of the washing process, and the representative example is a multistage counter current stabilizing treatment as described in JP-A-57-8543.

EXAMPLES

The present invention will be described below in greater detail by referring to Examples, but the present invention should not be construed as being limited thereto.

Example 1

Emulsion A-1: Preparation of Sample of a Cubic Silver Chloride Emulsion

To a 3% aqueous solution of lime-processed gelatin were added 3.5 g of sodium chloride and 1.0 ml of 1% aqueous solution of N,N'-dimethylimidazolidine-2-thione, successively. To the resulting aqueous solution were added an aqueous solution containing 0.8 mol of silver nitrate (Solution 1) and an aqueous solution containing 0.8 mol of sodium chloride (Solution 2) under vigorous stirring at 50° C. Then, an aqueous solution containing 0.20 mol of silver nitrate (Solution 3) and an aqueous solution containing 0.20 mol of sodium chloride (Solution 4) were added thereto under vigorous stirring at 50° C. Thereafter, the reaction mixture was subjected to precipitation and water-washing at 40° C. for desalination. Further, 80.0 g of lime-processed gelatin was added and pH and pAg of the resulting emulsion were adjusted to 7.2 and 7.0, respectively. To the emulsion were added $1.1\times10^{-4}$ mol/molAg of a gold sensitizer, chloroauric acid, $2.7\times10^{-6}$ mol/molAg of a sulfur sensitizer, triethylthiourea, $1.4\times10^{-5}$ mol/molAg of a red-sensitive spectral sensitizing dyes, G and H, and $2.6\times10^{-3}$ mol of the following compound I, and thereby optimal chemical sensitization and spectral sensitization were effected at 60° C. Further, $7.7\times10^{-4}$ mol/molAg of 1-(5-methylureidophenyl)-5-mercaptotetrazole was added thereto. The resulting silver chloride emulsion was named A-1.

(Sensitizing dye G)

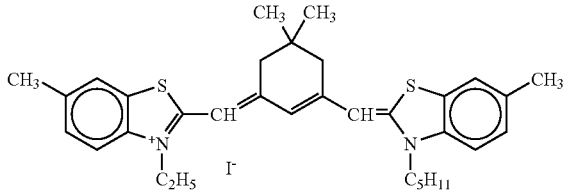

(Sensitizing dye H)

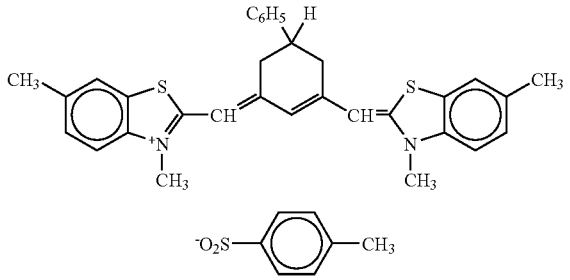

(Compound I)

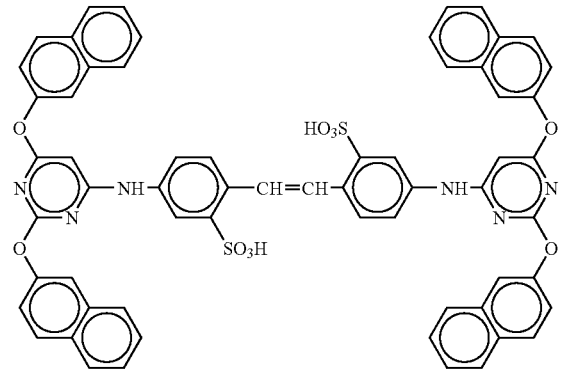

Emulsion A-2: A Cubic Silver Chloride Emulsion to Which $[IrCl_6]^{3-}$ was Doped (Comparison)

In the method of preparing Emulsion A-1, $[IrCl_6]^{3-}$ was added to each of Solution 2 and Solution 4 in an amount of $3\times10^{-8}$ mol per mol of silver to be added at each step to obtain Emulsion A-2.

Emulsion A-3: A Cubic Silver Chloride Emulsion to Which $[Ir(H_2O)Cl_5]^{2-}$ was Doped (Invention)

In the method of preparing Emulsion A-1, $[Ir(H_2O)Cl_5]^{2-}$ was added to each of Solution 2 and Solution 4 in an amount of $4\times10^{-7}$ mol per mol of silver to be added at each step to obtain Emulsion A-3.

Emulsion A-4: A Cubic Silver Chloride Emulsion to Which $[Ir(O)Cl_5]^{4-}$ was Doped (Invention)

In the method of preparing Emulsion A-1, $[Ir(O)Cl_5]^{4-}$ was added so as to be contained in the grains in an amount of $3\times10^{-7}$ mol per mol of silver, whereby an emulsion A-4 was obtained.

Emulsion B-1: Preparation of Sample of a Cubic Silver Chlorobromide (0.23 mol % of silver bromide) Emulsion To a 3% aqueous solution of lime-processed gelatin were added 3.5 g of sodium chloride and 1.0 ml of 1% aqueous solution of N,N'-dimethylimidazolidine-2-thione, successively. To the resulting aqueous solution were added an aqueous solution containing 0.8 mol of silver nitrate (Solution 5) and an aqueous solution containing 0.8 mol of sodium chloride (Solution 6) under vigorous stirring at 50° C. Then, an aqueous solution containing 0.20 mol of silver nitrate (Solution 7) and an aqueous solution containing 0.20 mol of sodium chloride (Solution 8) were added thereto under vigorous stirring at 50° C. Thereafter, the reaction mixture was subjected to precipitation and water-washing at 40° C. for desalination. Further, 80.0 g of lime-processed gelatin was added and pH and pAg of the resulting emulsion were adjusted to 7.2 and 7.0, respectively. To Emulsion was added at 60° C. a silver chlorobromide fine grain emulsion (halogen ratio, Br/Cl=60/40) having a grain size of 0.05 μm in an amount of 0.004 mol as silver amount to form a silver bromide-rich phase on the surface of the silver chloride host grains. Then, $1.1\times10^{-4}$ mol/molAg of a gold sensitizer, chloroauric acid, $2.7\times10^{-6}$ mol/molAg of a sulfur sensitizer, triethylthiourea, $1.4\times10^{-5}$ mol/molAg of red-sensitive spectral sensitizing dyes, G and H, and $2.6\times10^{-3}$ mol of the above compound I were added thereto, whereby optimal chemical sensitization and spectral sensitization were effected at 60° C. Further, $7.7\times10^{-4}$ mol/molAg of 1-(5-methylureidophenyl)-5-mercaptotetrazole was added thereto. The resulting silver chlorobromide emulsion (0.23 mol % of silver bromide) was named B-1.

Emulsion B-2 and B-3: A Cubic Silver Chloride Emulsion to Which $[IrCl_6]^{3-}$ was Doped (Comparison)

In the method of preparing Emulsion B-1, $[IrCl_6]^{3-}$ was incorporated in the silver chlorobromide grains in an amount of $1.7\times10^{-4}$ mol/molAg during the grain formation, whereby Emulsion B-2 is obtained. Further, in the method of preparing Emulsion B-2, $[IrCl_6]^{3-}$ was added to Solution 8 in an amount of $3\times10^{-8}$ mol per mol of silver to be added at the step to obtain Emulsion B-3.

Emulsion B-4: A Cubic Silver Chlorobromide Emulsion to Which $[Ir(H_2O)Cl_5]^{2-}$ of the Present Invention was Doped (Invention)

In the method of preparing Emulsion B-2, $[Ir(H_2O)Cl_5]^{2-}$ was added to Solution 8 in an amount of $4\times10^{-7}$ mol per mol of silver to be added at the step to obtain Emulsion B-4.

Emulsion B-5: A Cubic Silver Chlorobromide Emulsion to Which $[Ir(O)Cl_5]^{4-}$ of the Present Invention was Doped (Invention)

In the method of preparing Emulsion B-2, $[Ir(O)Cl_5]^{4-}$ was added so as to be contained within 20% surface layer of the silver chloride host grains in an amount of $3\times10^{-7}$ mol per mol of silver, whereby Emulsion B-5 was obtained.

Emulsion C-1: Preparation of Sample of a Cubic Silver Chloroiodide Emulsion

To a 3% aqueous solution of lime-processed gelatin were added 3.5 g of sodium chloride and 1.0 ml of 1% aqueous solution of N,N'-dimethylimidazolidine-2-thion, successively. To the resulting aqueous solution were added an aqueous solution containing 0.8 mol of silver nitrate (Solution 9) and an aqueous solution containing 0.8 mol of sodium chloride (Solution 10) under vigorous stirring at 50° C. Then, an aqueous solution containing 0.20 mol of silver nitrate (Solution 11) and an aqueous solution containing 0.198 mol of sodium chloride (Solution 12) were added thereto under vigorous stirring at 50° C. When 65% of the amount of Solution 11 had been added, an aqueous solution containing 0.002 mol of potassium iodide was added thereto. Thereafter, the reaction mixture was subjected to precipitation and water-washing at 40° C. for desalination. Further, 80.0 g of lime-processed gelatin was added and pH and pAg of the resulting emulsion were adjusted to 7.2 and 7.0, respectively. To the emulsion were added at $1.1\times10^{-4}$ mol/molAg of a gold sensitizer, chloroauric acid, $2.7\times10^{-6}$ mol/molAg of a sulfur sensitizer, triethylthiourea, $1.4\times10^{-5}$ mol/molAg of a red-sensitive spectral sensitizing dyes, G and H, and $2.6\times10^{-3}$ mol of the above compound I, and thereby optimal chemical sensitization and spectral sensitization were effected at 60° C. Further, $7.7\times10^{-4}$ mol/molAg of 1-(5-methylureidophenyl)-5-mercaptotetrazole was added thereto. The resulting silver chloroiodide emulsion (0.2 mol % of silver iodide) was named C-1.

Emulsion C-2: A Cubic Silver Chloroiodide Emulsion to Which $[IrCl_6]^{3-}$ was Doped (Comparison)

In the method of preparing Emulsion C-1, $[IrCl_6]^{3-}$ was added to the position having a silver content of 95 to 98% in the grains in an amount of $3\times10^{-7}$ mol per mol of total silver, whereby Emulsion C-2 was obtained.

Emulsion C-3: A Cubic Silver Chloroiodide Emulsion to Which $[Ir(H_2O)Cl_5]^{2-}$ of the Present Invention was Doped (Invention)

In the method of preparing Emulsion C-2, $[Ir(H_2O)Cl_5]^{2-}$ was added to the position having a silver content of 83 to 93% in the grains in an amount of $8\times10^{-7}$ mol per mol of total silver, whereby Emulsion C-3 was obtained.

Emulsion C-4: A Cubic Silver Chloroiodide Emulsion to Which $[Ir(O)Cl_5]^{4-}$ of the Present Invention was Doped (Invention)

In the method of preparing Emulsion C-2, $[Ir(O)Cl_5]^{4-}$ was added to the position having a silver content of 83 to 93% in the grains in an amount of $6\times10^{-7}$ mol per mol of total silver, whereby Emulsion C-4 was obtained.

The silver halide grains contained in Emulsion thus obtained had almost equal size, and were cubes having an average side length of 0.5 μm, the variation coefficient of the grain size being 0.08. The grain size was represented by the average value of diameters of circles equivalent to the projected areas of the grains (i.e., the average equivalent circle diameter), and the grain size distribution was represented by the value calculated from the division of standard deviation of the grain size by the average grain size.

Next, 25.0 ml of ethyl acetate and 4.2 g of a solvent (solv-6) were added to 9.6 g of a cyan coupler (ExC-1), and 0.6 g of a color image stabilizer (Cpd-9), 5.4 g of a color image stabilizer (Cpd-20), 12 g of a color image stabilizer (Cpd-1), 1.5 g of a color image stabilizer (Cpd-12), and 0.4 g of a color image stabilizer (Cpd-19), and the whole was mixed to dissolve each other. The resulting solution was dispersed and emulsified into 402 ml of 10% aqueous gelatin solution containing 20 ml of 10% sodium dodecylbenzenesulfonate to prepare an emulsified Dispersion A.

(ExC-1) Cyan Coupler
A 15:85 mixture (molar ratio) of:
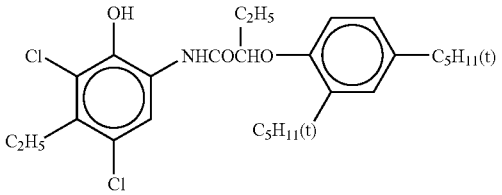
and
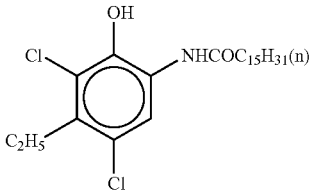
(Cpd-9) Color Image Stabilizer
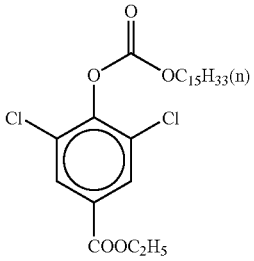
(Cpd-1) Color Image Stabilizer
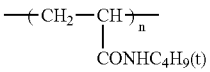
number average molecular weight: 60,000
(Cpd-12) Color Image Stabilizer
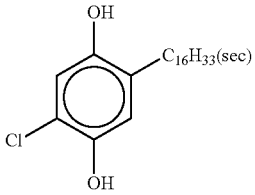
(Cpd-19) Color Image Stabilizer
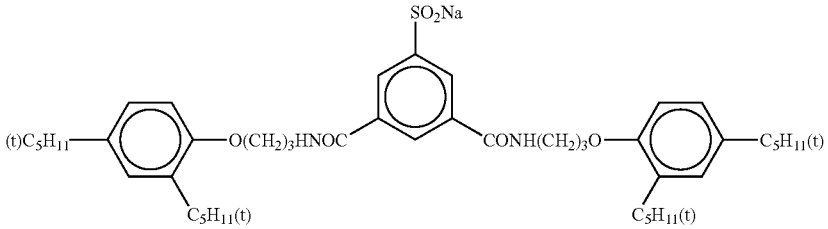
(Cpd-20) Color Image Stabilizer A 2:4:4 mixture (weight ratio) of:

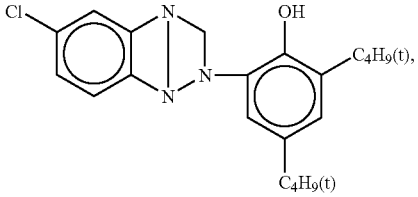

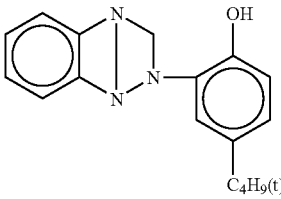

and

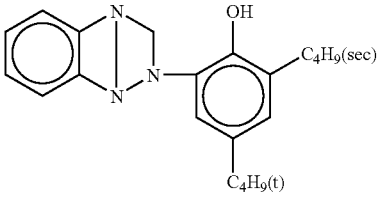

Solv-6

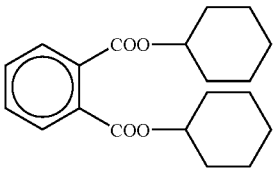

The above coupler emulsified dispersion was mixed with an emulsion to prepare a coating solution so that the solution had a composition described in Table 2, and the coating solution was applied onto a paper support whose both surfaces were laminated with polyethylene. Thus, 13 kinds of light-sensitive materials were prepared, which were referred to as the same names as that of Emulsions used, the contents being shown in Table 2. The polyethylene on which an emulsion layer and a protective layer were applied contained titanium dioxide and a trace amount of ultramarine. As a hardener for each layer, 1-oxy-3,5-dichloro-s-triazine sodium salt was used.

TABLE 1

| | |
|---|---|
| Second layer (Protective layer): | |
| gelatin | 1.34 g/m$^2$ |
| First layer (Red-sensitive layer): | |
| emulsion | 0.4 g/m$^2$ |
| cyan coupler (ExC-1) | 0.32 g/m$^2$ |
| color image stabilizer (Cpd-9) | 30 mg/m$^2$ |
| color image stabilizer (Cpd-19) | 20 mg/m$^2$ |
| color image stabilizer (Cpd-20) | 18 mg/m$^2$ |
| color image stabilizer (Cpd-1) | 40 mg/m$^2$ |
| color image stabilizer (Cpd-12) | 5 mg/m$^2$ |
| solvent (Solv-6) | 0.14 g/m$^2$ |
| gelatin | 1.34 g/m$^2$ |
| Support polyethylene-laminated support at both surfaces | |

TABLE 2

| Name of emulsion | Halide composition | $[IrCl_5]^{3-}$ ion-containing layer in grains | Metal complex of the invention | Metal complex-containing layer |
|---|---|---|---|---|
| A-1 | AgCl | none | | none |
| A-2 | AgCl | homogeneous in grain | | none |
| A-3 | AgCl | none | $[Ir(H_2O)Cl_5]^{2-}$ | homogeneous in grain |
| A-4 | AgCl | none | $[Ir(O)Cl_5]^{4-}$ | homogeneous in grain |
| B-1 | AgClBr | none | | none |
| B-2 | AgClBr | surface AgBr-rich layer | | none |
| B-3 | AgClBr | surface AgBr-rich layer + AgCl host surface 20% | | none |
| B-4 | AgClBr | surface AgBr-rich layer | $[Ir(H_2O)Cl_5]^{2-}$ | AgCl host surface 20% |
| B-5 | AgClBr | surface AgBr-rich layer | $[Ir(O)Cl_5]^{4-}$ | AgCl host surface 20% |
| C-1 | AgClI | none | | none |
| C-2 | AgClI | in grain at 95 to 98% | | none |
| C-3 | AgClI | in grain at 95 to 98% | $[Ir(H_2O)Cl_5]^{2-}$ | in grain at 83 to 93% |
| C-4 | AgClI | in grain at 95 to 98% | $[Ir(O)Cl_5]^{4-}$ | in grain at 83 to 93% |

For examining the photographic properties of these coated samples, the following experiment was carried out. First, the coated samples were subjected to gradation exposure for sensitometry using sensitometers (FWH model manufactured by Fuji Photo Film Col., Ltd. and SMP-201A manufactured by Yamashita Denso). The exposure at that time was 300 CMS, and the exposure was conducted through 680 nm interference filter at low illumination intensity for 10 seconds or at high illumination intensity for $10^{-6}$ second. Thereafter, the following color developing treatment was carried out at 10 seconds after the exposure or 2 hours after the exposure.

| (Treating step) | (Temperature) | (Time) |
|---|---|---|
| Color development | 35° C. | 45 seconds |
| Fixing with bleaching | 35° C. | 45 seconds |
| Water-washing | 28 to 35° C. | 90 seconds |

| | |
|---|---|
| Color developing solution: | |
| triethanolamine | 8.12 g |
| N,N-diethylhydroxylamine | 4.93 g |
| fluorescent brightening agent (UVITEX CK manufactured by Ciba-Geigy) | 2.80 g |
| 4-amino-3-methyl-N-ethyl-N-[β-(methanesulfonamide)ethyl]-p-phenylenediamine sulfate | 4.96 g |
| sodium sulfite | 0.13 g |
| potassium carbonate | 18.40 g |
| potassium hydrogen carbonate | 4.85 g |
| EDTA•2Na•2$H_2O$ | 2.20 g |
| sodium chloride | 1.36 g |
| water to make | 1000 ml |
| pH | 10.05 |
| Solution for bleach-fixing: | |
| ammonium thiosulfate (54 wt %) | 103.0 ml |
| $NH_4$EDTA•Fe | 54.10 ml |
| EDTA•2Na•2$H_2O$ | 3.41 g |
| sodium sulfite | 16.71 g |
| glacial acetic acid | 8.61 g |
| water to make | 1000 ml |
| pH | 5.44 |

The color density of each sample after the treatments was measured to determine sensitivity and gradation. Sensitivity was defined by a reciprocal number of the exposure amount giving the color density which is 1.0 higher than minimum color density, and was expressed as a relative value where a certain sensitivity of the sample B-2 is 100, the sensitivity being obtained by development at 10 seconds after the exposure of the sample B-2 for 10 seconds at room temperature. Further, since the variation of gradiation by high intensity reciprocity failure was especially remarkable at shoulder part, gradation was expressed by the difference between a logarithmic value of the exposure amount for giving color density of 1.5 and a logarithmic value of the exposure amount for giving color density of 2.0. The smaller the value is, the harder the tone is. The results are shown in Table 3.

TABLE 3

| Name of Sample/ Emulsion | Exposure for 10 sec. Sensitivity | Gradation | Exposure for $10^{-6}$ sec. Sensitivity | Gradation | Sensitivity change during 2 hours until development after exposure | Remarks |
|---|---|---|---|---|---|---|
| A-1 | 130 | 0.17 | 80 | 0.55 | 5 | Comparison |
| A-2 | 95 | 0.16 | 85 | 0.16 | 25 | Comparison |
| A-3 | 95 | 0.16 | 90 | 0.17 | 15 | Invention |
| A-4 | 95 | 0.16 | 90 | 0.16 | 15 | Invention |
| B-1 | 135 | 0.19 | 75 | 0.58 | 5 | Comparison |
| B-2 | 100 | 0.19 | 80 | 0.45 | 10 | Comparison |
| B-3 | 95 | 0.19 | 90 | 0.19 | 25 | Comparison |
| B-4 | 100 | 0.18 | 95 | 0.18 | 5 | Invention |
| B-5 | 100 | 0.18 | 95 | 0.18 | 5 | Invention |
| C-1 | 140 | 0.20 | 80 | 0.60 | 5 | Comparison |
| C-2 | 110 | 0.19 | 100 | 0.20 | 20 | Comparison |
| C-3 | 115 | 0.17 | 110 | 0.17 | 0 | Invention |
| C-4 | 115 | 0.17 | 115 | 0.17 | 0 | Invention |

As is apparent from the above table, when $[IrCl_6]^{3-}$ is solely doped in the grains as in the cases of Emulsion A-1, B-1, and C-1, the high (illumination) intensity reciprocity failure becomes small but sensitivity variation is large. However, doping of the metal complex of the present invention remarkably improved the high (illumination) intensity reciprocity failure with maintaining the sensitivity variation small. In particular, remarkable effects were observed in the case of the emulsion wherein the metal complex of the present invention was doped to a silver chlorobromide layer or a silver iodobromide layer, or was doped in combination with $[IrCl_6]^{3-}$.

Example 2

Each sample was prepared by using Emulsion B-4, B-5, C-3, or C-4 of the present invention as the emulsion of Sample 405 in Example of JP-A-11-282108. Good results were obtained through development of the samples according to the method described in the publication.

EFFECT OF THE INVENTION

According to the present invention, there is provided a silver halide photographic light-sensitive material excellent in latent image stability and also excellent in reciprocity failure.

While the invention has been described in detail and with reference to specific embodiments thereof, it will be apparent to one skilled in the art that various changes and modifications can be made therein departing from the spirit and scope thereof.

What is claimed is:

[1. A silver halide photographic light-sensitive material comprising a support having thereon at least one silver halide emulsion layer, wherein the silver halide emulsion contained in the silver halide emulsion layer comprises silver halide grains having a silver chloride content of 90 mol % or more, and the silver halide emulsion further contains an iridium complex having $H_2O$ as a ligand.]

2. The silver halide photographic light-sensitive material as in claim [1] *3*, wherein the iridium complex is represented by formula (I):

$$[M(H_2O)_nX_m]^l \quad (I)$$

wherein M represents an iridium atom, X represents a halogen atom, l is an integer of −5 to 0, m is an integer of 1 to 5, and n is an integer of 1 to 5.

3. [The] *A* silver halide photographic light-sensitive material [as in claim 1.] *comprising a support having thereon at least one silver halide emulsion layer,* wherein the silver halide emulsion *contained in the silver halide emulsion layer* comprises silver halide grains having *a normal crystal grain structure, a silver chloride content of 90 mol % or more and* a silver bromide content of 0.1 to 10 mol %*, and the silver halide emulsion further contains an iridium complex having $H_2O$ as a ligand.*

4. The silver halide photographic light-sensitive material as in claim [1] *3*, wherein the silver halide emulsion comprises silver halide grains having a silver iodide content of 0.02 to 3 mol %.

5. The silver halide photographic light-sensitive material as in claim [1] *3*, wherein the silver halide emulsion further contains a metal complex represented by formula (II):

$$[IrCl_6]^{s-} \quad (II)$$

wherein s is 2 or 3.

*6. The silver halide photographic light-sensitive material as in claim 3, wherein the silver halide grains have a cubic crystal grain structure.*

*7. A silver halide photographic light-sensitive material comprising a support having thereon at least one silver halide emulsion layer, wherein the silver halide emulsion contained in the silver halide emulsion layer comprises silver halide grains having a normal crystal grain structure, a silver chloride content of 90 mol % or more and a silver iodide content of 0.02 to 3 mol %, and the silver halide*

*emulsion further contains an iridium complex having $H_2O$ as a ligand.*

*8. The silver halide photographic light-sensitive material as in claim 7, wherein the iridium complex is represented by formula (I):*

$$[M(H_2O)_nX_m]^l \quad (I)$$

*wherein M represents an iridium atom, X represents a halogen atom, l is an integer of −5 to 0, m is an integer of 1 to 5, and n is an integer of 1 to 5.*

*9. The silver halide photographic light-sensitive material as in claim 7, wherein the silver halide emulsion further contains a metal complex represented by formula (II):*

$$[IrCl_6]^{s-} \quad (II)$$

*wherein s is 2 or 3.*

*10. The silver halide photographic light-sensitive material as in claim 7, wherein the silver halide grains have a cubic crystal grain structure.*

* * * * *